United States Patent
Eusebio et al.

(10) Patent No.: US 8,562,882 B2
(45) Date of Patent: Oct. 22, 2013

(54) METHOD FOR PRODUCING HOMOGENEOUSLY CRYSTALLIZED POLYCONDENSATE PELLETS

(75) Inventors: Fernando Eusebio, Uttwil (CH); Brent Allan Culbert, Wil (CH); Andreas Christel, Zuzwil (CH); Peter Locker, Grossostheim (DE)

(73) Assignee: Bühler AG, Uzwil (CH)

( * ) Notice: Subject to any disclaimer, the term of this patent is extended or adjusted under 35 U.S.C. 154(b) by 214 days.

(21) Appl. No.: 12/518,325

(22) PCT Filed: Dec. 5, 2007

(86) PCT No.: PCT/CH2007/000612
§ 371 (c)(1),
(2), (4) Date: Oct. 2, 2009

(87) PCT Pub. No.: WO2008/071023
PCT Pub. Date: Jun. 19, 2008

(65) Prior Publication Data
US 2010/0038806 A1    Feb. 18, 2010

(30) Foreign Application Priority Data
Dec. 11, 2006  (DE) .................. 10 2006 058 642

(51) Int. Cl.
*B29B 9/06*    (2006.01)
(52) U.S. Cl.
USPC .............. 264/141; 264/140; 264/171.231; 422/245.1; 95/108; 96/123; 96/150
(58) Field of Classification Search
USPC .............. 264/140, 141, 171.23; 422/245.1; 95/108; 96/123, 150
See application file for complete search history.

(56) References Cited

U.S. PATENT DOCUMENTS

| | | | |
|---|---|---|---|
| 3,544,525 A | 12/1970 | Balint et al. | |
| 5,714,571 A * | 2/1998 | Al Ghatta et al. | 528/308.2 |
| 2005/0065318 A1* | 3/2005 | Jernigan et al. | 528/480 |
| 2007/0276120 A1* | 11/2007 | DeBruin et al. | 528/308.1 |

FOREIGN PATENT DOCUMENTS

| | | |
|---|---|---|
| DE | 10 2004 015 515 | 9/2004 |
| DE | 103 49 016 | 6/2005 |
| EP | 0379684 | 8/1990 |
| EP | 0597155 | 5/1994 |
| EP | 0864409 | 9/1998 |
| WO | 01/12698 | 2/2001 |

* cited by examiner

*Primary Examiner* — Christina Johnson
*Assistant Examiner* — Stella Yi
(74) *Attorney, Agent, or Firm* — Shoemaker and Mattare

(57) ABSTRACT

The invention relates to a method for the continuous production of semicrystalline polycondensate pellets. Said method comprises the following steps: producing a polycondensate material; shaping polycondensate pellets and solidifying the polycondensate melt in a liquid cooling medium, wherein the shaping of the pellets can be carried out prior to or after solidification; separating the pellets from the liquid cooling medium once the polycondensate pellets have cooled down to an average temperature that lies within the crystallization temperature range of the polycondensate; and crystallizing the pellets in a treatment chamber, the treatment gas being led in said treatment chamber in a countercurrent to the polycondensate pellets, the flow rate of the treatment gas being above the incipient fluidization point of the polycondensate pellets and the polycondensate pellets having a narrow dwell time spectrum in the treatment chamber.

7 Claims, 2 Drawing Sheets

METHOD FOR PRODUCING HOMOGENEOUSLY CRYSTALLIZED POLYCONDENSATE PELLETS

The invention relates to a process for the continuous production of semicrystalline polycondensate pellets as claimed in the preamble of claim 1.

The prior art discloses processes which permit production of semicrystalline pellets from molten crystallizable polycondensates via cooling, chopping, and heat treatment. Usually, the polycondensate is cooled to a temperature below its glass transition temperature and reheated for the crystallization process. Alternatively, the cooling can be performed to a suitable crystallization temperature, and crystallization can then be achieved without introduction of external heat.

(DE 103 49 016, Bruckmann; DE 10 2004 015 515, Otto et al.). A disadvantage of these processes is, however, that they cannot satisfy the requirements for flexibly adjustable and homogeneous output quality, in relation to temperature and degree of crystallization. A further disadvantage is that agglomerates frequently form in the initial region of the crystallization zone which do not always fully dissolve.

Better temperature control is achieved if the pellets, while they are still hot, are crystallized in a fluidized bed with additional introduction of a hot treatment gas, as described in U.S. Pat. No. 3,544,525 (Ballnt et al.) or WO 01/12698 (Borer et al.). The control and homogeneity of the crystallization process continue to be unsatisfactory.

WO 01/12698 (Borer et al.) further proposes using a combination of spouted bed and fluidized bed, permitting better control and homogeneity of the crystallization. However, a disadvantage here is that large amounts of treatment gas have to be used to vortex the polycondensate pellets over a long treatment section.

In contrast, an object of the present invention is to provide a process which can produce homogeneously crystallized polycondensate pellets with controlled temperature and without agglomeration, in a manner which is simple and saves energy.

The object is achieved according to claim 1, by producing a polycondensate melt, shaping and cooling it in a liquid coolant to pellets, whereupon the pellets in the liquid coolant are conveyed to a separator and separated from the liquid coolant. The pellets are then treated in a crystallizer with a narrow residence-time profile in countercurrent with a treatment gas, which flows through the pellets at a rate above their fluidization rate.

In one preferred embodiment, the temperature of the treatment gas is above the average temperature of the pellets, with the resultant advantage that the polycondensate pellets can be adjusted to a constant and defined output temperature.

Suitable polycondensates encompass crystallizable, thermoplastic polycondensates, e.g. polyamides, polyesters, polycarbonates, polyhydroxyalkanoates, polylactides, or copolymers of these, obtained via a polycondensation reaction with elimination of a low-molecular-weight reaction product. The polycondensation reaction here can take place directly between the monomers or by way of an intermediate, which is then reacted via transesterification, where the transesterification reaction can in turn take place with elimination of a low-molecular-weight reaction product or via ring-opening polymerization. The resultant polycondensate is in essence linear, but a small number of branching points can be produced.

Polyamide here is a polymer obtained via polycondensation from its monomers, either a diamine component and a dicarboxylic acid component or a bifunctional monomer having an amine group and having a carboxylic acid end group.

Polyester here is a polymer obtained via polycondensation from its monomers, a diol component and a dicarboxylic acid component. Various diol components are used, mostly linear or cyclic. It is also possible to use various dicarboxylic acid components, mostly aromatic. Instead of the dicarboxylic acid, it is also possible to use its corresponding dimethyl ester.

Typical examples of polyesters are polyethylene terephthalate (PET), polybutylene terephthalate (PBT), and polyethylene naphthalate (PEN), which are used either in the form of homopolymer or in the form of copolymers.

Polyethylene terephthalate is obtained from its monomers, a diol component and a dicarboxylic acid component, where the diol component is composed of ethylene glycol (1,2-ethanediol) as main monomer and the dicarboxylic acid component is composed of terephthalic acid as main monomer. Comonomers that can be used are other linear, cyclic, or aromatic diol and, respectively, dicarboxylic acid compounds. Typical comonomers are diethylene glycol (DEG), isophthalic acid (IPA), or 1,4-bishydroxymethylcyclohexane (CHDM).

Polyhydroxyalkanoates are polymers obtained via polycondensation from their monomers, with the general formula $HO-CH(R)-(CH_2)_n-COOH$, where R is usually an aliphatic hydrocarbon having from 1 to 15 carbon atoms and n=from 1 to 10, usually from 1 to 3. A typical example is polyhydroxybutyrate, where $R=CH_3$ and $n=1$.

Polylactides (known as polylactic acid, PLA) are polymers which can be obtained directly, with elimination of water, from lactic acid, or via ring-opening polymerization from its cyclic dimers (lactides).

The polycondensate can be a virgin material or a recyclate. Recyclates is the term used for recycled polymers from production and processing (post-industrial), or polymers collected and recycled after use by consumers (post-consumer).

Additives can be added to the polymer. Examples of suitable additives are catalysts, dyes and pigments, UV blockers, processing aids, stabilizers, impact modifiers, chemical and physical blowing agents, fillers, nucleating agents, flame retardants, plasticizers, particles improving barrier properties or improving mechanical properties, reinforcing materials, such as beads or fibers, and also reactive substances, e.g. oxygen absorbers, acetaldehyde absorbers, or substances that increase molecular weight, etc.

A polymer melt is produced by means of apparatuses or reactors known in the art. In principle, it is possible to use polymerization reactors in which polymers are produced in a liquid phase, examples being stirred tanks, cage reactors or disk reactors, or else apparatuses in which previously produced polymers are melted, e.g. extruders or kneaders. The polymer melt can be produced continuously or batchwise. However, continuous processes are preferred for continuous processing.

Individual polycondensate strands are shaped from the polycondensate melt in an output device, in particular a die or die plate. Pellets can be produced from the polycondensate strands by using the pelletizing techniques known in the art, examples being strand pelletization, water-cooled die-face pelletization, underwater pelletization, or hot-face pelletization. The polycondensate strands emerging from the melt channels here are solidified and separated into a large number of individual pellets, and the separation here can take place prior to or after the solidification process.

Despite use of the term "water" in the names of the pelletization equipment, it is also possible to use other liquids.

An example of the method of separation uses spontaneous droplet formation, or a shearing medium, or mechanical separation, in particular chopping.

Whereas spontaneous droplet formation or droplet formation caused by a shearing medium takes place at the output from the die, chopping can take place either directly at the output from the die or else only after passage through a treatment section. Solidification of the polycondensate melt takes place via cooling with the aid of one or more coolant fluids, and these can be gaseous (e.g. air, nitrogen, or $CO2$) or liquid (e.g. water or ethylene glycol) coolants or a combination thereof. According to the present invention, at least one liquid coolant is used. The polycondensate, in particular in the form of polycondensate strands or in the form of droplets, can by way of example, prior to entry into the liquid coolant, flow through a section which comprises a process gas, in particular air or aqueous mist.

The average pellet size is preferably from 0.1 mm to 10 mm, more preferably from 0.5 mm to 3 mm, and even more preferably from 0.85 mm to 2.5 mm.

The pellets are preferably intended to have a defined pellet shape, for example to be cylindrical, spherical, droplet-shaped, or spheroidal, or to have the type of designed shape proposed by way of example in EP 0 541 674 (Yau).

The polycondensate pellets can be cooled to an average temperature which is below the crystallization temperature range of the polycondensate. However, it is preferable that the polycondensate pellets are cooled to an average temperature which is within the crystallization temperature range of the polycondensate. To this end, it is possible to increase the temperature of the coolant and/or to select an appropriately short residence time in the coolant. Simultaneously with the cooling process, the polycondensate pellets can be conveyed to a further step of a process.

The suitable crystallization temperature range is discernible when the crystallization half-life time (t %) is plotted as a function of temperature. It has upward and downward limits resulting from the temperature at which the crystallization half-life time reaches about 10 times the minimum crystallization half-life time. Since it is difficult to determine very short crystallization half-life times ($t\frac{1}{2}$), $t\frac{1}{2}=1$ minute is used as minimum value. The temperature range for polyethylene terephthalate is from 110 to 220° C.

The crystallization half-life time is determined by means of isothermal crystallization in the DSC (Differential scanning calorimetry), and $t\frac{1}{2}$ here corresponds to the time needed to achieve 50% of the achievable crystallinity, at the stated temperature, after the induction time.

After the cooling process, the coolant is separated from the pellets. A further treatment (conditioning) of the pellets in a liquid optionally takes place, and this can use the coolant directly or another liquid.

The pellets are separated from a liquid coolant by means of separators known in the prior art. These can simply be passive separators, e.g. grids or gratings, through which the coolant can pass but the pellets cannot pass. However, it is usual to use active separators at least for a portion of the separation process, which is based on passage of a gas, or based on centrifugal force, or impact-based. Examples of apparatuses of this type are known as suction extractors, impact dryers, or centrifugal dryers. It is equally possible that a portion of the separation process uses an unsaturated, optionally heated, stream of gas to evaporate the coolant.

Once the polycondensate pellets have been separated from the liquid coolant, they can be directly transferred into the downstream treatment space for the crystallization process. However, the polycondensate pellets can also optionally be passed through a conveying section, where constant relative movement between the individual pellets has to be ensured. The relative movement can be achieved, for example, via a high flow rate in a pipeline (greater than 0.3 m/min, in particular greater than 1 m/min), via circulation of a conveying gas around the material, via mechanical movement, for example by means of an agitator or conveying screw or via oscillation or vibration.

In the invention, the polycondensate pellets in essence flow downward through the treatment space for the crystallization process, whereas a treatment gas flows upward through the treatment space. To this end, the superficial velocity of the treatment gas is above the fluidization point of the polycondensate pellets in the treatment space.

The polycondensate pellets flow through the treatment space with a narrow residence-time profile.

In order to ensure that the residence-time profile is narrow, under the stated conditions, high levels of fluidization must be avoided at least in portions of the treatment space. This can be achieved by inhibiting bubble formation in the treatment space via use of layers of baffles, as proposed in the application entitled "Device and method for the thermal treatment of bulk material" from Bühler AG (filed on Dec. 8, 2006), or setting the treatment-gas velocity only slightly above the fluidization point of the polycondensate pellets, and at the same time setting a high settling rate of the polycondensate pellets.

A housing surrounds the treatment space for the crystallization process. The horizontal cross section of the treatment space can have any desired shape, but is preferably round or rectangular. The arrangement of the treatment space is in essence vertical, so that the pellets can flow downward through the apparatus. It is important here that uniform flow of the product can be achieved. A jacket delimits the treatment space laterally. The jacket wall here can be composed of cylindrical or conical segments, or of a combination of conical and cylindrical segments, and this can be used to influence the gas velocity distribution across the height of the apparatus. Widening in the upper region here can give a reduction in gas velocity, preventing discharge of pellets.

A narrowing in the upper region can increase gas velocity, leading to a greater degree of fluidization, thus preventing any caking.

One particular embodiment provides an at least approximately rotationally symmetrical housing jacket, and this gives advantages in manufacturing technology, and also advantages for regular product flow.

Arranged in the interior of the treatment space, there can be a displacer through which pellets do not flow, and which therefore reduces the size of the treatment space. These displacers can by way of example be used for guiding the passage of treatment gas, for appropriate adjustment of the free cross-sectional area, or for improving the flow of pellets.

At least one feed aperture opens into the upper region of the treatment space, and allows the pellets for treatment to be introduced into the treatment space. The feed aperture can, for example, be an aperture in the housing, or can be the exit from a pipe which is conducted into the housing. The feed aperture can have division into a plurality of segments, thus permitting distribution of the pellets within the treatment space.

At least one discharge aperture opens into the lower part of the treatment space, and through this it is possible to discharge treated pellets from the treatment space. The discharge aperture can, for example, be an aperture in the housing or the entry into a pipe which is conducted out of the housing. The pellets are usually introduced into the discharge aperture via a conical region. The angle of the outflow cone with respect to a horizontal plane is preferably from 50 to 80° if the pellets are not fluidized or vibrated in the discharge cone, and from 15 to 60°, in particular from 30 to 50°, if the pellets are fluidized or vibrated in the discharge cone.

As an alternative, it is also possible to introduce the pellets into the discharge aperture by means of a mechanical discharge apparatus, for example a screw. Below the discharge aperture, there can be a barrier element, e.g. a rotary valve, a horizontally arranged discharge roll, or an automatic slide, with the aid of which the flow of pellets out of the treatment space is regulated. An example of a control variable that can be used here is the fill level of the pellets in the treatment space or the weight of the pellets in the apparatus.

In the basal region of the treatment space, there is at least one device for introducing a treatment gas. This device has at least one entry aperture, through which treatment gas flows into the treatment space.

The device for introducing a treatment gas can encompass apparatuses such as open-base cones or series of ridge structures, or else lines or metal sheets with exit holes, as long as distribution of the treatment gas is sufficiently uniform. In one particular embodiment, the treatment space is delimited downward by an at least to some extent gas-permeable barrier device, in particular a perforated metal sheet with a large number of entry apertures through which treatment gas can flow at least at some points, but through which pellets cannot flow. To this end, the apertures are smaller than the diameter of the pellets. The permeable area is preferably from 1% to 30%. Preferred are apertures from 20% to 90%, more preferred from 30% to 80%, of the diameter of the pellets. The number, size, and arrangement of the apertures here can be uniform or non-uniform. The arrangement of the barrier device is conical or horizontal.

Below the barrier device, there can be a distributor space, through which treatment gas is conducted to the barrier apparatus. At least one aperture for introduction of treatment gas opens into this distributor space. The arrangement can also have apparatuses for the distribution of the treatment gas, examples being baffle plates, valves, or flaps, or else separate channels for individual introduction of treatment gas.

As an alternative, there can be a non-gas-permeable barrier device providing downward delimitation of the treatment space. In this case, the at least one device for introduction of a treatment gas can be an aperture in the housing, or the exit from a pipe or from a plurality of pipes, which are conducted into the housing, or a single ridge structure or a series of ridge structures, these having either holes or open bases. It is possible here to use a displacer to introduce the gas.

In one particular embodiment of the present invention, in addition to the at least one device for introduction of treatment gas in the basal region of the treatment space, at least one further device for introduction of treatment gas opens into treatment space, the result being that multistage introduction of heat can be achieved, as also can a multistage gas-velocity profile.

In the upper region of the treatment space, there is at least one removal device for the treatment gas. The removal device can, for example, be an aperture in the housing, or the entry into a pipe, which is conducted out from the housing. The location of the removal device here can be within the jacket or the top cover of the treatment space.

In or below the removal device, there can be apparatuses which permit the passage of treatment gas but inhibit the passage of pellets. This can be achieved by way of example by using a curved or deflected flow passage, or with the aid of deflecting internals, an example being a zig-zag separator.

Between the removal device and device for introduction of the treatment gas, there can be a closed or to some extent closed circuit.

Preferably, the temperature at which the treatment gas is conducted into the treatment space is above the average temperature of the polycondensate pellets on entry into the treatment space. To this end, the treatment gas is at least to some extent circulated, but a small amount of replacement gas is always introduced and removed. Within the circuit there can also be devices such as compaction devices (e.g. fans, blowers, or compressors), heat exchangers, or cleaning devices (e.g. filters, cyclones, washers, or catalytic combustion devices). Since much of the compaction energy is transferred as heat to the stream of gas, the increased treatment-gas temperature can also be maintained without any large addition to the heater rating. However, if the entry temperature of the polycondensate pellets alters, this can be compensated by means of the additional heater rating.

A high settling rate of the polycondensate pellets in the treatment space prevents channeling, which permits passage of large amounts of treatment gas through the bed of pellets with only little heat exchange between gas and pellets. Adequate settling rates are greater than 0.05 m/min, in particular greater than 0.15 m/min. The settling rate is intended usually to be below 5 m/min, in particular below 2 m/min, since otherwise it is necessary to use very short treatment times or very large treatment spaces.

A sufficiently narrow residence-time profile is obtained when the preliminary characteristic of a residence-time profile is better than that of a stirred-tank cascade composed of three or more, in particular four or more, stirred tanks. The preliminary characteristic here describes the profile from the juncture zero up to the average residence time. The result is to ensure that at least 95%, in particular at least 97%, of the polycondensate pellets in the treatment space have a minimum residence time of more than 20% of the average residence time.

The average residence time is a result of the throughput of pellets and of the volume of the treatment space. The minimum average residence time has been reached when agglomeration occurs in the process. The maximum average residence time results from a maximum permissible height of the treatment space, and this height is dictated by the system for introduction of the treatment gas. Average residence times of from 0.2 to 60 minutes are advantageous, and by way of example adequate average residence times for the treatment of polyethylene terephthalate with comonomer content less than 6 mol % are from 1 to 15 minutes, in particular from 2 to 8 minutes.

Fluidization point is the term used for the flow rate which gives maximum free flow of the bed. Determination of the fluidization point from measurement of a pressure-loss profile is shown in VDI Wärmeatlas [The VDI heat atlas] 5th edition 1988, FIG. 4, in section Lf. An approximate calculation method can be found in "Wärme und Stoffübertragung in der Wirbelschicht [Heat- and mass-transfer in fluidized beds]; H. Martin; Chem. Ing. Tech 52 (1980) no. 3, pp. 199-209". For porosity (P), a particle-geometry calculation is used, where $P=(1/14/Os)^{(1/3)}$, and Os=surface area of sphere of identical volume/particle surface area.

For non-spherical bulk particles, the diameter of the sphere of identical volume can be used.

As an alternative, porosity can also be calculated from the weight of the bed at the fluidization point and the density of the product: $P=1-\text{bulk density/density of product}$.

If severe deviations occur in the porosity values from the two types of calculation, it is always necessary to carry out a measurement.

In the case of pellets having an average diameter of from 1.4 to 5 mm and a temperature of from 0° C. to 300° C., the fluidization point is achieved at a superficial velocity of about from 0.6 to 2 m/s.

Average pellet diameter here is equal to the average diameter of the identical-volume spheres corresponding to the pellets.

Superficial velocity here is equal to the gas velocity in the empty treatment space, and is calculated from the quantity of gas per unit of time, divided by the cross section of the treatment space.

Further advantages, features, and possible applications of the invention are apparent from the description, which now follows, of two embodiments of the invention, using the drawing, where:

Figure 1:
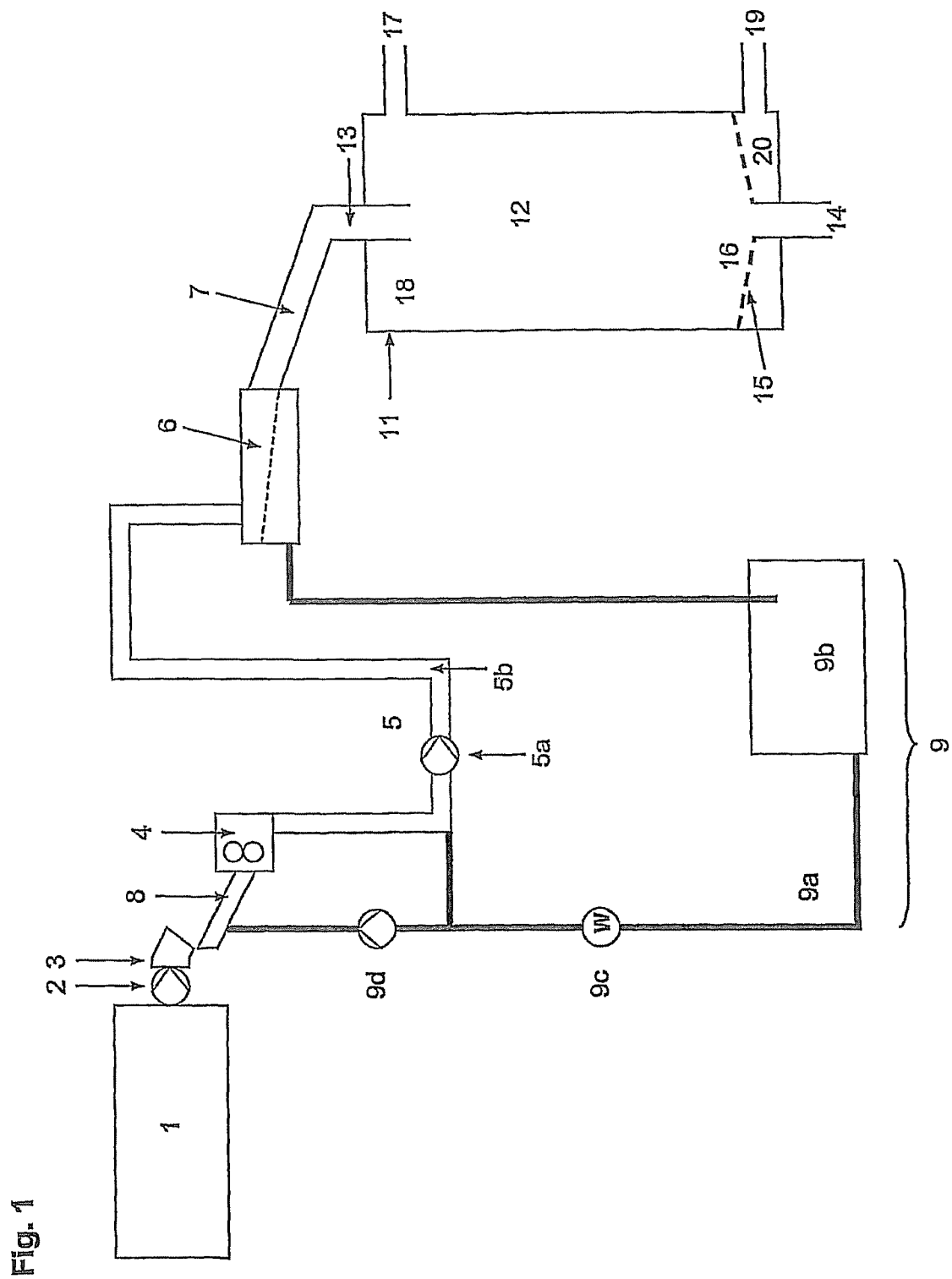
FIG. 1 shows a first embodiment of the present invention.

FIG. 1 shows one embodiment of the present invention, where polycondensate material is discharged from a melt reactor (1) by means of a melt pump (2) and optionally of a melt filter (not shown), and forced through a die (3) in the shape of a strand. The polycondensate strands are cooled on a cooling apparatus (8) and chopped by means of a pelletizer (4), to give pellets. Downstream of the pelletizer (4), the pellets flow through a conveyor section (5) to a pellet dryer (6). In the conveyor line (5b), the arrangement can optionally have a pump (5a), branches, such as diverter pipes, agglomerate separators, or feeders for alternative coolants and/or alternative conveyor media. Separated coolant is conveyed within a circuit system (9), which here is composed of pipelines (9a), of at least one tank (9b), of at least one heat exchanger (9c), and of at least one pump (9d), thus ensuring controlled contact between temperature-controlled coolant and the polycondensate strands.

Once the coolant has been separated, the pellets pass into the treatment space (12) by way of a further conveyor section (7) and the feed aperture for pellets (13) in the upper region (18). In the treatment space, the pellets are treated in countercurrent with a treatment gas, where the treatment gas passes into a distributor space (20) via an inlet aperture (19), and is conducted into the basal region (16) of the treatment space (12) via a device for introducing treatment gas (15), in this case a perforated sheet, and in the upper region (18) is in turn conducted out of the treatment space (12) via a removal device for treatment gas (17).

Because the quantity of gas has been adjusted to be above the fluidization point of the pellet bed, the pellets in essence flow through the treatment space (12) in the form of an unconsolidated fixed bed, in plug-flow mode, and leave the treatment space (12) via the discharge aperture (14), where the amount discharged is regulated via a barrier apparatus (not shown), for example a rotary valve or a pneumatic slide.

Figure 2:
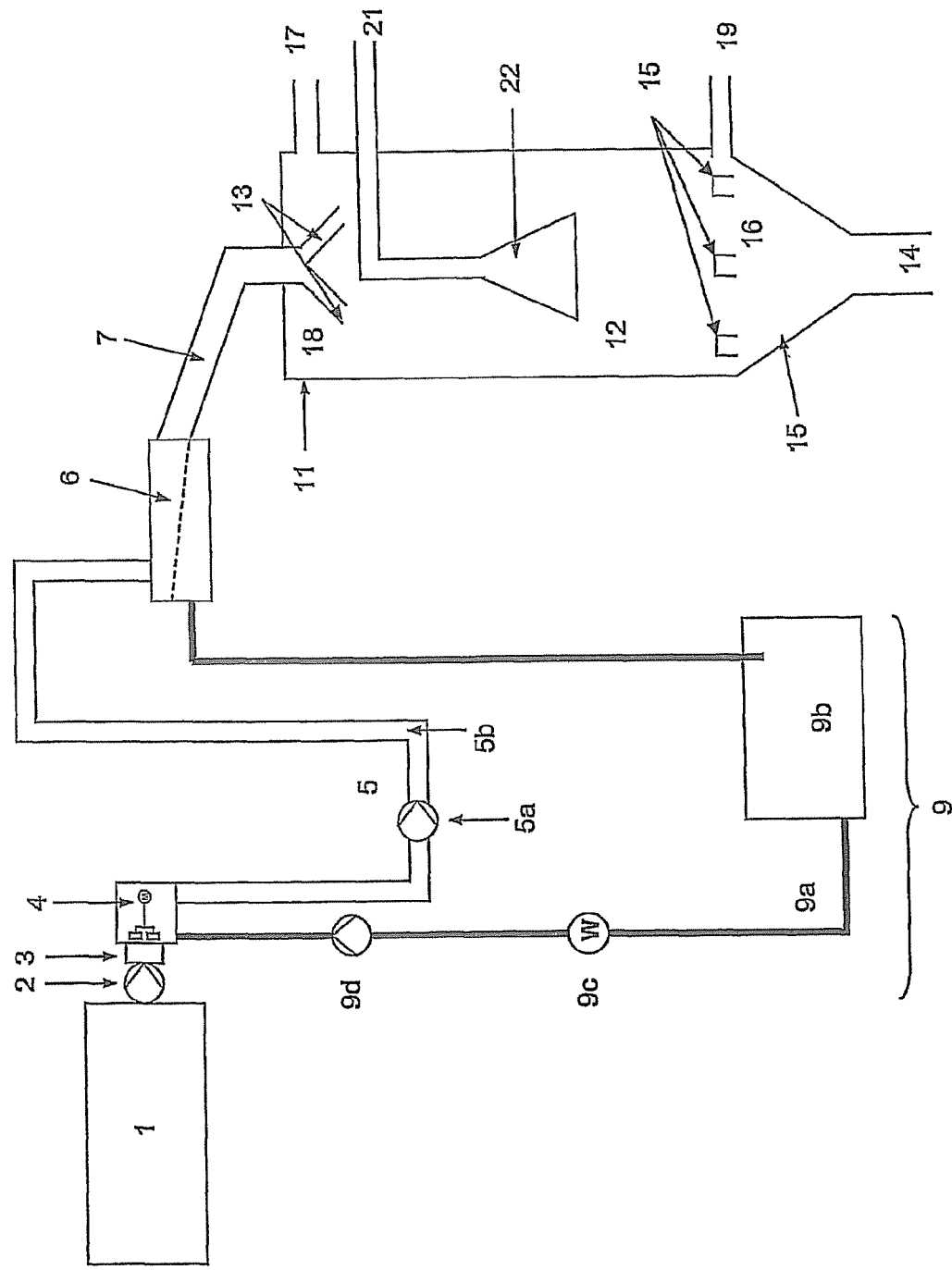
FIG. 2 shows a second embodiment of the present invention.

FIG. 2 shows another embodiment of the present invention, with the difference that, instead of strand pelletization, underwater pelletization is used, where the polycondensate strands are chopped directly at the exit from the die, by means of an underwater chopper (4). Other differences shown are two feed apertures for pellets (13) within the treatment space (12). The treatment gas is introduced firstly via an inlet aperture (19) into a device for introducing treatment gas (15), in this case a large number of inlet channels, and into the basal region of the treatment space (16). Secondly, treatment gas is introduced via a further inlet aperture (21) into a further device for introducing treatment gas (22), in this case an open-based, inverted cone, into a region above the basal region (16) of the treatment space (12).

The result is that the treatment space (12) is divided into two zones, and the quantity of gas here in both regions is above the fluidization point of the pellet bed. However, a greater degree of fluidization and backmixing occurs in the upper region, and this leads to a rapid equalization of temperature between pellets and treatment gas. Again, there is a treatment zone with narrow residence-time profile present in the lower region.

The advantages of the process of the invention are illustrated in an example of an application, where the residence time for the production of homogeneous, agglomerate-free pellets is lower than those of conventional processes.

EXAMPLE 1

A polyethylene terephthalate copolymer having 2 mol % of IPA modification and having an IV value of 0.6 dl/g was processed in an experimental rig as in FIG. 2, where the melt has been produced in a twin-screw extruder and no pump (5a) was used. Throughput was 200 kg/h, and the temperature of the melt at the exit from the die was 290° C. Underwater pelletization was used to give a pellet weight of 18 mg. The liquid coolant used was water at 90° C. The average temperature of the pellets on entry into the treatment space was about 140° C. The treatment space had been divided into two zones by the two gas-inlet apparatuses, and air at 170° C. was introduced into the lower zone, giving a gas velocity (superficial velocity) of about 1 m/sec, and additional air at 180° C. was introduced into the upper zone, giving a gas velocity of about 2 m/sec. A high degree of fluidization resulted in the upper zone across a bed height of 30 cm with a residence time of about 2 minutes. The result in the lower zone was an agitated fixed bed with a settling rate of 90 mm/min across a bed height of 100 cm, with a residence time of about 9 minutes. Addition of colored PET pellets gave a residence-time profile from 4 to 25 minutes, but with no discharged pellets having a residence time of less than minutes. The discharge temperature of the pellets was 175° C. The pellets were entirely white, without any content of amorphous (clear) pellets. DSC enthalpy of fusion was 41.8 J/g, corresponding to 36% crystallinity. No clumps or agglomerates were formed.

KEY

1. Reactor
2. Conveyor apparatus for polycondensate melt
3. Die
4. Chopper (pelletizer)
5. Conveyor apparatus for transport of polycondensate pellets in a liquid coolant
6. Separator for separating polycondensate pellets from liquid coolant
7. Conveyor apparatus for polycondensate pellets
8. Cooling apparatus for cooling polycondensate strands
9. Return system for liquid coolant
11. Housing jacket
12. Treatment space
13. Feed aperture for pellets
14. Discharge aperture for pellets
15. Device for introducing treatment gas
16. Basal region of treatment space
17. Removal device for treatment gas 18. Upper region of treatment space
19. Inlet aperture for treatment gas
20. Distributor space for gas inlet
21. Further inlet aperture
22. Further device for introducing treatment gas

What is claimed is:

1. In a process for continuous production of semicrystalline polycondensate pellets, comprising the following steps:
    producing a polycondensate melt having a crystallization temperature range;
    shaping polycondensate pellets;
    solidifying the polycondensate melt in a liquid coolant prior to or after the pellet shaping step;
    separating the pellets from the liquid coolant, as soon as the polycondensate pellets have cooled to an average temperature which is within the crystallization temperature range of the polycondensate; and
    crystallizing the pellets in a treatment space in which the pellets are maintained in a fluidized condition by means of a treatment gas, the improvement wherein:
    the treatment gas in the treatment space is conducted in countercurrent with respect to the polycondensate pellets,
    the flow rate of the treatment gas is slightly above the fluidization point of the polycondensate pellets, and
    at least 95% of the polycondensate pellets in the treatment space have a minimum residence time of more than 20% of the average residence time.

2. The process as claimed in claim 1, wherein treatment gas is introduced at a temperature which is above the average temperature at which the polycondensate pellets enter the treatment space.

3. The process as claimed in claim 1, wherein the liquid coolant is circulated and heated.

4. The process of claim 1, wherein the polycondensate is polyamide, polycarbonate, polyhydroxyalkanoate, polylactide, or polyester, or a copolymer of these and/or a mixture of these.

5. The process as claimed in claim 4, wherein the polyester is polyethylene terephthalate (PET), polybutylene terephthalate (PBT) or polyethylene naphthalate (PEN).

6. The process as claimed in claim 1, wherein the settling rate of the polycondensate pellets in the treatment space is greater than 0.05 m/min.

7. The process as claimed in claim 1, wherein the settling rate of the polycondensate pellets in the treatment space is greater than 0.15 m/min.

* * * * *